Oct. 27, 1931.  J. BRINCIL  1,828,731

METHOD OF MAKING PARTIALLY LINED BEARINGS

Original Filed March 26, 1928

INVENTOR
Joseph Brincil

Patented Oct. 27, 1931

1,828,731

UNITED STATES PATENT OFFICE

JOSEPH BRINCIL, OF READING, PENNSYLVANIA

METHOD OF MAKING PARTIALLY LINED BEARINGS

Original application filed March 26, 1928, Serial No. 264,666. Divided and this application filed January 21, 1929. Serial No. 333,878.

This invention relates to bearings of the lined type and method of making them and is a division of application Serial No. 264,666, filed March 26, 1928, for partially lined bearings.

In the past efforts have been made to reduce the cost of bearings by uniting the costly bearing metals onto a cheaper metal such as steel.

Steel shapes or steel strips were tinned and lined with molten bearing metals such as babbitt, either by the die-casting method or by centrifugal action. These bearings then consisted of a steel base fully lined with a thin layer of costly Babbitt metal. These methods substantially reduced the cost of bearings.

Another type of bearing consists of a tinned strip of steel in circular form fully lined with a strip of bronze metal. As an example of the reduction of cost of these methods it will be apparent that if a strip of steel one thirty-second of an inch thick, has a bearing lining of strip bronze one thirty-second of an inch thick united thereto, the average cost of the combined metals is substantially lowered over a strip of sheet bronze one-sixteenth of an inch thick. This latter method effects a reduction of approximately thirty-three per cent in the material cost.

The object of the present invention is to still further reduce the cost of lined bearings and at the same time retain the good bearing qualities of the bronze or Babbitt metals.

It has been noticed that most all worn bearings when being replaced, show the worn surface in the direction of the load thrust, and the side opposite the thrust shows practically no wear.

As most bearings must be fitted with one and one-half to two-thousandths of an inch of clearance so as to insure the bearing and shaft from seizure, it will be apparent that this clearance space between shaft and bearing will take place opposite the load thrust. This clearance space also acts as a small reservoir for oil.

From this it will be apparent that the half of the bearing opposite the load thrust will not have full contact of the shaft, such as the half of the bearing in direction of the load thrust.

With this point in view, I have proceeded to line only that part of the bearing which is necessary, thereby reducing the amount of expensive bearing metal, and at the same time retaining the good qualities of whatever bearing metal that is to be used.

I proceed to do this by taking a piece of strip steel to be used as a base metal, and running it between two rolls, one roll of which forms a longitudinal recess or depression in the center of the strip. The width of this recess is equal to about one-half the width of the strip, and the depth of the recess is approximately one half the thickness of the strip. The recess in the strip is then cleaned of all foreign matter, after which it is fluxed and tinned.

A strip of bronze bearing metal is cut to a width corresponding to the width of the recess in the base metal. This bronze strip is also cleaned of all dirt and grease and one surface is fluxed and tinned.

The tinned bronze bearing strip is placed in the recess of the base metal, and by means of heat and pressure is united to the base metal.

If a bearing with an oil groove is desired, the bronze strip is perforated with a diagonal opening spaced along the bronze strip according to the length of the finished bearing.

The combined strip is then trimmed to the exact width necessary, and then parts are sheared transversely along the strip.

The sheared parts are then formed into bearings, with the bearing metal forming a lining on the lower half of the bearing.

By only using a bearing lining where it is absolutely necessary, the average cost of this combination of metals reaches sixty percent below that of a strip of bronze metal of the same thickness.

In the accompanying drawings, Figure 1 is a plan view of a strip of steel or base metal with a longitudinal recess, and a strip of bearing metal united to the recess.

Figure 1:
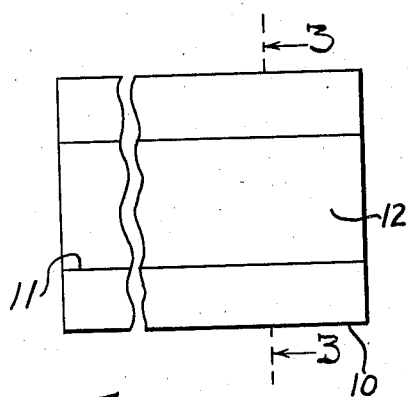

Referring to Figure 1, the numeral 10 represents a strip of base metal preferably steel because of being the least expensive, and 11 shows a longitudinal recess or depression below the general surface of the metal, with the bearing metal strip 12 united to the recess by solder.

I form the recess 11 in strip 10 by running the steel strip between two hardened steel rolls, the top roll having a width equal to the width of the recess, while the bottom roll is sufficiently long enough to extend out beyond the width of the steel strip.

The recess is then cleaned properly to remove all grease and dirt and is then tinned by fluxing only the recess, and running the fluxed strip thru a bath of molten tin. Any suitable flux may be used such as rosin or any of the soldering acids.

A bearing strip of bronze is then sheared to a width equal to the width of the recess and is also tinned on one surface by fluxing one side and running it thru a bath of molten tin.

The tinned strip of bronze is then united to the tinned strip of base metal by applying the two tinned surfaces together and moving the two strips over any suitable means of heating and then compressing the strips between rolls and allowing them to cool off.

Figure 2:
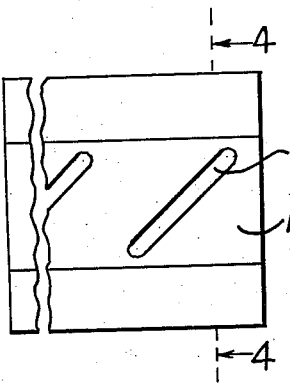
Figure 2 is a plan view of a strip of recessed base metal with a perforated strip of bearing metal united thereto.
Figures 3, 4:
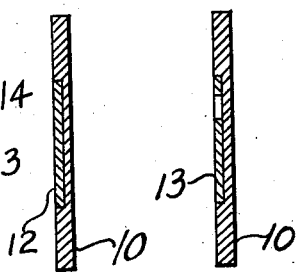
Figure 3 is a sectional view along 3—3 in Figure 1.
Figure 4 is a sectional view along 4—4 in Figure 2.

If a bearing with an oil groove is desired a strip of bronze is perforated as is shown by 13 in Figure 2, and the same procedure is followed as in the plain bronze strip.

Figure 6:
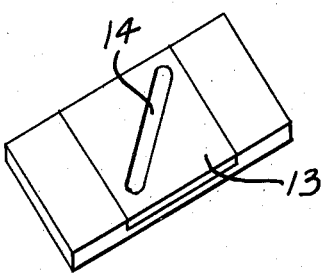
Figure 6 is a perspective view of a part cut off from strip in Figure 2.

The perforations 14 to be used as oil grooves in bearing strip 13 are pierced in a punch press, and are spaced so that when each part is cut off, it will contain one perforation 14 extending diagonally across the bearing strip to serve as a reservoir for oil as is shown in Figure 6.

Figure 5:
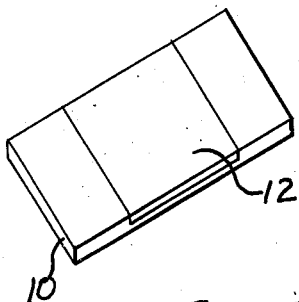
Figure 5 is a perspective view of a part cut off from strip in Figure 1.

The combined strip in Figure 1 is then fed thru a suitable punch press where parts are cut off as is shown in Figure 5.

The parts are cut off across the width of the strip; the width constituting the circumference of the bearing to be formed, and the length of the parts comprise the length of the bearing.

Figure 6 shows a part cut off from the combined strips in Figure 2, and contains a perforated section of bearing element 13, having a perforation 14 to be used as an oil groove.

Figure 7:
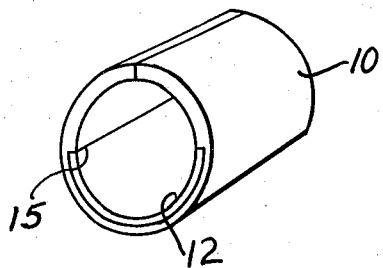
Figure 7 is a perspective view of a finished bearing.

The parts are then formed in cylindrical form as is shown in Figure 7, where the ends 15 of bearing element 12 are shown abutting against the recessed walls of the base metal, thus insuring against any movement of the bearing element 12 when the shaft is in motion.

Figure 8:
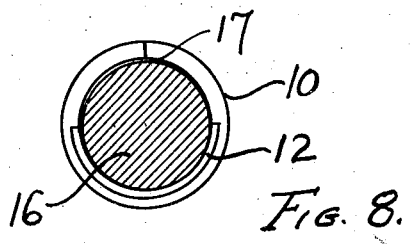
Figure 8 is an end view of a finished bearing with a sectional view of a shaft contained therein.

In Figure 8 is shown an end view of the partially lined bearing with a section of a shaft 16 assembled therein. The clearance 17 between shaft 16 and the partially lined bearing is shown in exaggeration, when the load thrust is down on the lined part of the bearing.

While I have shown the preferred form of embodiment of my invention, it will be understood that the recess in the base metal may also be broached in after the base metal is formed into cylindrical form, or steel tubing may also be used; the recess being formed at the time the tube is extruded.

I claim:

1. The method of making a partially lined bearing which comprises forming a recess in a strip of base metal, then tinning the recessed surface, then uniting to the tinned recess surface a bearing metal by means of heat and pressure, then cutting the combined base and bearing metal strip into parts of the required lengths, and forming the said parts into cylindrical form.

2. The method of making a partially lined bearing which comprises forming a longitudinal recess in a strip of base metal, then tinning the recessed surface, then uniting to the tinned recessed surface, a tinned strip of bearing metal, then cutting the combined base and bearing metal strip into parts, and forming said parts into cylindrical form.

3. The method of making a partially lined bearing which comprises forming a recess in a strip of base metal, then tinning the recessed surface, applying to the tinned recessed surface a perforated strip of bearing metal, one surface of which is tinned, then uniting the tinned surface of the base metal to the tinned surface of the perforated bearing metal by means of heat and pressure, then cutting the combined base and bearing metal strip into parts each containing a perforated section, and forming the said parts into cylindrical form.

4. The method of making a partially lined bearing which comprises forming a longitudinal recess centrally located in a strip of base metal, then tinning the recessed surface, then uniting to the tinned recessed surface a tinned strip of bearing metal, by means of heat and pressure, then cutting the combined base and bearing metal strip into parts, and forming the said parts into cylindrical form, with the bearing lining innermost and centrally located.

In testimony whereof I affix my signature.

JOSEPH BRINCIL.